June 18, 1957 J. J. EBERS ET AL 2,796,563

SEMICONDUCTIVE DEVICES

Filed June 10, 1955

INVENTORS J. J. EBERS
J. J. KLEIMACK

BY D.H. Wilson, Jr.
ATTORNEY 2,796,563
Patented June 18, 1957

2,796,563

SEMICONDUCTIVE DEVICES

Jewell J. Ebers, Whippany, and Joseph J. Kleimack, Scotch Plains, N. J., assignors to Bell Telephone Laboratories, Incorporated, New York, N. Y., a corporation of New York Application June 10, 1955, Serial No. 514,492
6 Claims. (Cl. 317—235)

This invention relates to semiconductive devices and contact structures therefor.

Recently semiconductive devices have been developed which utilize semiconductive bodies of single crystal form. Often the semiconductive bodies are limited in their thickness to only a few mils. Bodies of this type, in order to provide optimum operating characteristics, should be incorporated into the device structure with a stable support which avoids, to as great an extent as possible, the introduction of strains and imperfections in the single crystal body, both in fabrication and use. Attempts have been made to support semiconductive bodies with structures which avoid straining the crystal by soldering or otherwise securing the body to a massive metallic body, preferably matching the thermal coefficient of expansion of the semiconductor. However, such supports do not lend themselves to some contact configurations, require expensive machining operations, do not offer the electrical characteristics often required, and due to their size, are not suitable in some structures.

Desirable electrical characteristics have been realized in some transistor structures by establishing an essentially ohmic connection, a base connection, to the semiconductive body in the immediate vicinity of the rectifying barrier region in the body associated with the emitter or collector connection thereto. In the past, such contacts have been established by applying a thin film of conductive material over a surface portion of the body surrounding the emitter or collector region of a transistor to afford the desired electrical characteristics while supporting the body with a supplementary, rigid, mechanical member, or in those cases where thick bodies are employed, by relying upon its own structural characteristics to sustain it. Contacts of this form are disclosed in R. L. Wallace Patent 2,563,503, issued August 7, 1951. The fabrication of devices of this nature has heretofore required complex processing and therefore has been expensive.

A unitary support and connection structure was sought which would combine the attributes of mechanical stability, low base resistance, and simplicity. Attempts were made to form a base from a metal sheet by piercing the sheet, bonding the wafer to the sheet over the aperture, and establishing rectifying barrier regions to the wafer within said aperture. However, it was found that the bonding operation produced cracks in a large number of the wafers, particularly those of less than 10 mils thickness, thereby effectively destroying them. This cracking was found to be due to mismatches in the thermal coefficients of expansion of the sheet metal and a bending of the flat wafers incident to the buckling of the sheet metal during heating and copling. Attempts to match the thermal coefficients of expansion and to flatten the normally flat sheet stock produced little improvement.

In view of the above, objects of this invention are to facilitate the manufacture of semiconductive devices, to reduce the loss of these devices during manufacture, to simplify the structure of such devices, to improve their electrical characteristics, and to reduce the strains introduced into semiconductive bodies during their fabrication into devices and after they have been incorporated in those devices.

One feature of this invention is a unitary sheet metal electrical connection and mechanical support for a semiconductive body having an area which is raised out of or depressed in the major plane of the sheet metal surface and is of the same degree of flatness as the body surface which it engages. It has been found that a contact area of this type can be formed with a degree of flatness corresponding to that of the surface to which it is to be attached, is considerably more rigid than a plane sheet, offers a better support structure for the semiconductive wafer, and maintains its flatness during the heating and cooling cycles to which the semiconductive-electrode assembly is subjected during processing.

Another feature resides in forming said support and connection as a raised portion of a sheet metal member coated with a material which will form a low temperature eutectic with the semiconductor and securing said support to the semiconductor by maintaining it against the semiconductor while heating the combination to a temperature above the melting temperature of the eutectic. The electrical characteristics of a contact of this nature can be adjusted by a suitable choice of coating composition.

A further feature resides in a transistor structure comprising a thin wafer of semiconductive material, principally of one conductivity type, having a pair of parallel plane major faces, an alloyed region on each face, a region of semiconductive material adjacent each alloyed region of a conductivity type opposite the major portion of the wafer, and a contact to one major surface of the wafer surrounding one of said regions of opposite conductivity type and formed as the plane periphery of an aperture in a sheet metal member. The planarity of this aperture periphery is insured by deforming the sheet metal member to shift the peripheral region out of the major plane of the surface of the member. An alloyed connection between a coating on this peripheral region and the semiconductive material serves to bond the two together. A structure of this nature can conveniently be formed with a wafer thickness of a few mils by techniques utilizing simple processing steps since only moderate temperatures are required in fabrication and simple punching, embossing, or coining operations can be employed in forming a sheet metal contact and support structure having sufficient stiffness and flatness over the contact area to avoid undue stressing of the wafer portions to which it is bonded. The annular contact afforded by the bonded peripheral region provides a very low base resistance for transistor structures, thereby improving their electrical characteristics and by virtue of its proximity to the rectifying regions in which most of the power dissipation within the transistor occurs it enables the contact structure to cool the device efficiently. ;

The above and other objects and features of this invention will be appreciated more fully from the following detailed description when read with reference to the accompanying drawing, in which.

Figure 1:
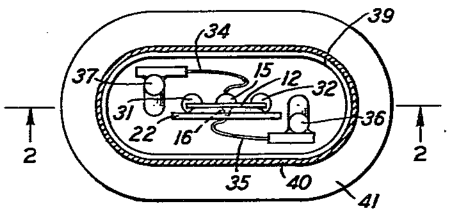
Fig. 1 is a plan view of one specific embodiment of an alloyed transistor in accordance with this invention.
Figure 2:
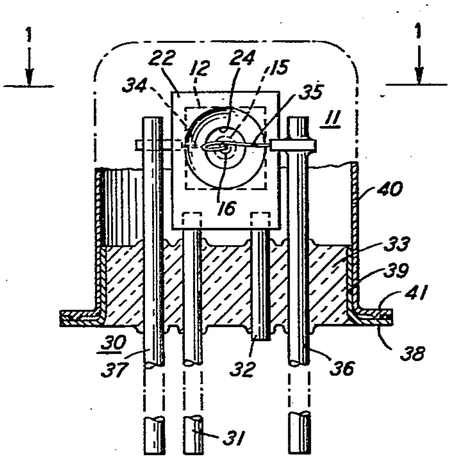
Fig. 2 is a front elevation of the transistor of Fig. 1.
Figure 3:
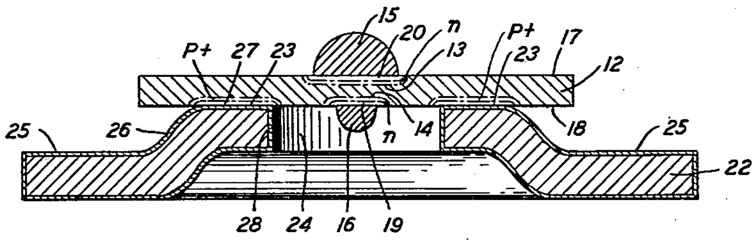
Fig. 3 is an enlarged view of a sectioned contact and semiconductive body as shown in Figs. 1 and 2 illustrating in detail certain of the features of this invention.

Referring now to the drawing, Figs. 1 and 2 show a transistor 11 having a semiconductive wafer 12. Rectifying barrier regions 13 and 14, in the form of n–p junctions, as shown in more detail in Fig. 3, are formed in the wafer by alloying metal bodies 15 and 16 to opposite faces 17 and 18. In practice it is often advantageous to provide one alloyed region 19, usually that which functions as the transistor-emitter, smaller than the opposite region 20, which functions as the collector.

A transistor base connection is secured to the wafer face bearing the emitter. This base connection comprises a sheet of metal 22 having a thermal coefficient of expansion similar to that of the semiconductor, for example of Kovar or molybdenum, and is provided with a contact portion 23 engaging the wafer outside of and around the alloyed region 19 of the emitter. The base contact area 23 may be restricted by forming it of only a limited portion of the member, advantageously the periphery of an aperture 24 corresponding in shape to the alloyed regions 19 and 20 (usually circular) and concentric therewith. The area is limited by forming the periphery so that it projects above the plane of the surface 25 of member 22, thereby reducing the area over which differences in the mechanical characteristics of the semiconductor and the contact are effective to create strains in the structure and also stiffening the member so as to reduce any tendency for it to warp. This area 23 can be punched, embossed, or coined to a flatness corresponding to the flatness of the semiconductive surface 18 so that strains are not introduced in the wafer 12 over the restricted area of contact in bonding the contact thereto.

The bonding of the base contact to the wafer can be accomplished by interposing between the two a layer 26 of material which alloys with the semiconductor and adheres to the sheet metal. This may be done by means of a foil of the bonding metal (not shown) or as a coating 26 applied to the sheet metal member over at least the contact area thereof as by plating. Since this structure functions as a base connection, it is desirable that the interfacial region have a low, essentially ohmic resistance. Such an electrical characteristic can be realized by an alloyed connection between a suitable coating material and the semiconductor by incorporating in the coating constituents which readily form low temperature alloys with the semiconductor and provide a smooth transition in resistivity from the metal to the semiconductor. In those embodiments where the wafer is p-type germanium or silicon, a gold coating or a mixture of gold and an acceptor such as gallium or indium, for example, applied electrolytically to a sheet member of an iron-nickel-cobalt alloy such as Kovar or of molybdenum, where high thermal conductivity is desired for enhanced heat dissipating capacity, will form an ohmic contact to the wafer. A gold plating containing a donor such as antimony or arsenic, for example in concentrations of about 3.5 percent, will form ohmic alloyed contacts to n-type germanium or silicon.

As shown in Fig. 3, the alloyed region 27 of the bond between the sheet support 22 and the semiconductor 12 tends to penetrate the wafer and form a low resistivity region therein. While it is desirable from the standpoint of obtaining a low base resistance in the resulting transistor to form this low resistivity region 27 close to the emitter and collector rectifying barrier regions 13 and 14, it cannot enter these barrier regions without destroying the transistor properties. Accordingly, in those devices employing a thin wafer and a collector region of greater area than the emitter region, the low resistance region of the transistor base is established beyond the extremes of a projection of the collector through the wafer thickness. This avoids the possibility of penetrating the collector barrier region with the low resistivity material of the base connection. The base connection can be maintained apart from the barriers by providing that aperture 24 in sheet member 22 is larger than the largest barrier region and positioning the periphery 28 of the aperture so that it does not overlap any projection through the wafer thickness of a portion of a barrier region. Thus, as shown in Fig. 3, the low resistance region or p+ region of the p conductivity type wafer is outside of the n conductivity type material of the emitter and collector alloy regions.

In a specific illustrative and exemplary embodiment a transistor of the type shown can be produced by alloying spheres of 3.5 percent arsenic-96.5 percent lead to opposite, plane, major faces 17 and 18 of a p conductivity type single crystal wafer 12 of germanium about 3 mils thick. A lead-arsenic-germanium mixture is formed which is bounded by a thin layer of n conductivity type germanium. The n–p junctions thus formed function in the transistor as an emitter region 14 of about 20 mils diameter and a concentric collector region 13 of about 40 mils diameter. The base connection is established by piercing a 5 mil thick iron-nickel-cobalt alloy sheet 22 with the circular aperture 24, 50 mils in diameter, and embossing a portion of the sheet including the periphery of this aperture to a raised flat 23 to form an annular area having an outer diameter of about 90 mils. This area is parallel to the plane of the major surface 25 of the sheet member and about 6 mils above that surface. A gold plating 26, about 0.4 mil thick, is applied to the annular area. Bonding of the annular area to the major face of the wafer carrying the emitter connection is accomplished by mounting the wafer against the convex peripheral portion 23 with the alloyed emitter button 16 centered in the aperture 24. The sheet member is mounted on a suitable heater, for example a graphite strip, and raised to a temperature in excess of the gold-germanium eutectic, 356° C., while in an inert atmosphere such as nitrogen or forming gas, to form the alloyed region 27 about one mil deep in the wafer.

This assembly can be conveniently handled by means of the sheet member 22 without danger of damaging the semiconductor. It is supported on a header 30, as shown in Figs. 1 and 2, by welding the sheet member 22 to the lead-in conductors 31 and 32 insulatingly sealed and secured in the header structure as by a fused glass bead 33. Emitter and collector terminals are connected to the alloy buttons 15 and 16 by means of conductive filaments 34 and 35 welded to lead-in connectors 36 and 37 and fused to the alloy buttons, for example in the manner disclosed in the application of P. Zuk, Serial No. 478,442, filed December 29, 1954. A housing in the form of a can 40, having a flange 41 surrounding its open end, is fitted over the assembly and is sealed by welding its flange to the flange 38 on metallic eyelet 39 surrounding and sealed to glass button 33.

While the preceding description has been directed to a specific form of sheet metal contact, a specific transistor form, and to specific materials, it is to be understood that alternatives are to be considered within the scope of this invention. The contact form can be applied to semiconductive devices other than transistors. Coatings of gold, indium, gallium, aluminum, antimony, and lead can be employed on the sheet metal contact structure to function as the bonding medium. Ohmic contacts can be provided to n-type material by plating a gold-antimony layer on the electrode structure, for example, by electroplating the sheet metal electrode or the semiconductor from a solution of potassium ferrocyanide, potassium gold cyanide, and potassium antimonate or potassium antimonyl tartrate. The form of the embossed area of the sheet metal contact can be modified to function as an emitter or collector electrode. Bonding materials can be employed which form rectifying junctions in the semiconductor. A base electrode wherein the semiconductive wafer is mounted within a depression in rather than upon a protuberance on the surface of the metal sheet will also provide the electrical, thermal, and mechanical advantages disclosed above. In instances where such substantial areas of the metal sheet and wafer are bonded together that destructive thermal strains may be induced in the wafer, the embossed contact portion can be cut into segments to reduce these strains, and, for example, may be radially slotted in the case of an annular contact region. Proper alloying of all segments can be insured with this configuration by employing a continuous bonding medium such as a gold foil annulus bridging between the segments and forming a continuous gold-semiconductor eutectic region during alloying. Semiconductors other than germanium and silicon, such as the group III–group V intermetallic compounds and silicon-germanium alloys can also be employed in this form of construction. Further, numerous other combinations of elements and materials can be devised by those skilled in the art without departing from the spirit or scope of this invention.

What is claimed is:

1. A semiconductive device comprising a wafer-shaped semiconductive body principally of p conductivity type, a plane surface on one face of said wafer, a metallic mass alloyed to said surface, a region in said wafer adjacent said mass of n conductivity type, a metallic sheet member of material having a coefficient of expansion of about the same value as that of the semiconductive body, said member having an aperture corresponding in shape to said region and of greater extent than the area of said region at said surface, a raised periphery bounding said aperture having a plane surface at its maximum separation from the major surface portion of said member, a gold plating on said plane portion of said raised periphery and an alloyed bond between said gold plating and said plane wafer face over a portion of said wafer face adjacent to and spaced from said region of n conductivity type.

2. A semiconductive device comprising a wafer-shaped semiconductive body principally of n conductivity type, a plane surface on one face of said wafer, a metallic mass alloyed to said surface, a region in said wafer adjacent said mass having a p conductivity type, a metallic sheet member having a coefficient of expansion of about the same value as that of the semiconductive body, said member having an aperture corresponding in shape to said region and of greater extent than the area of said region at said surface, a raised periphery bounding said aperture having a plane surface at its maximum separation from the major surface portion of said member, a plating of gold and a material selected from the group consisting of antimony and arsenic on said plane surface of said periphery and an alloyed bond between said plating and said plane wafer face over a portion of said wafer surface adjacent and spaced from said region of opposite conductivity type.

3. A semiconductive device comprising a semiconductive body, a plane surface on one face of said body, a metallic mass alloyed to said surface, a region in said body adjacent said mass having a conductivity type opposite that of said surface, a metallic sheet member having an aperture corresponding in shape to said region and of greater extent than the area of said region at said surface, a raised periphery bounding said aperture having a plane surface at its maximum separation from the major surface portion of said member, a plating on said plane surface of said periphery, said plating comprising a material which forms a eutectic with the semiconductive material, and an alloy bond between said plating and said wafer face over a portion of said plane body surface adjacent and spaced from said region.

4. A semiconductive device comprising a body of semiconductive material, a plane surface portion on said body, a sheet metal member, a planar surface region consisting of a portion of a major face of said sheet metal member lying in a plane distinct from the remaining surface portions of the major face, a plating on said planar surface region of said member, said plating comprising a material which forms a eutectic with the semiconductive material, and an alloy bond between said plating and said plane surface portion of said semiconductive body.

5. A semiconductive device comprising a body of semiconductive material, a plane surface portion of n conductivity type on said body, a sheet metal member, a planar surface region consisting of a portion of a major face of said sheet metal member lying in a plane distinct from the remaining surface portions of the major face, a plating on said planar surface region of said member, said plating comprising a material which forms a eutectic with the semiconductive material and including a substance which functions as a donor in the semiconductive material, and an alloy bond forming an ohmic connection between said plating and a portion of said n-type semiconductive body.

6. A semiconductive device comprising a body of semiconductive material, a plane surface portion of p conductivity type on said body, a sheet metal member, a planar surface region consisting of a portion of a major face of said sheet metal member lying in a plane distinct from the remaining surface portions of the major face, a plating on said planar surface region of said member, said plating comprising a material which forms a eutectic with the semiconductive material and including a substance which functions as an acceptor in the semiconductive material, and a eutectic bond forming an ohmic connection between said plating and a portion of said p-type semiconductive body.

References Cited in the file of this patent

UNITED STATES PATENTS

| | | |
|---|---|---|
| 2,644,852 | Dunlap | July 7, 1953 |
| 2,665,399 | Lingel | Jan. 5, 1954 |